(12) United States Patent
Morita (10) Patent No.: US 10,553,889 B2
(45) Date of Patent: Feb. 4, 2020

(54) CATALYST LAYER FOR FUEL CELL

(71) Applicant: TOYOTA JIDOSHA KABUSHIKI KAISHA, Toyota-shi, Aichi-ken (JP)

(72) Inventor: Tohru Morita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 86 days.

(21) Appl. No.: 15/806,674

(22) Filed: Nov. 8, 2017

(65) Prior Publication Data

US 2018/0138536 A1    May 17, 2018

(30) Foreign Application Priority Data

Nov. 17, 2016 (JP) .................. 2016-224289

(51) Int. Cl.
*H01M 8/1067* (2016.01)
*H01M 4/92* (2006.01)
(Continued)

(52) U.S. Cl.
CPC ....... *H01M 8/1067* (2013.01); *H01M 4/8652* (2013.01); *H01M 4/8663* (2013.01); *H01M 4/926* (2013.01); *H01M 8/1039* (2013.01); *H01M 8/1044* (2013.01); *H01M 2008/1095* (2013.01); *H01M 2300/0082* (2013.01); *H01M 2300/0091* (2013.01)

(58) Field of Classification Search
None
See application file for complete search history.

(56) References Cited

U.S. PATENT DOCUMENTS

2007/0196659 A1* 8/2007 Setoyama ............... H01M 4/90
428/408
2014/0162170 A1    6/2014 Amemiya
2014/0377689 A1* 12/2014 Aimu .................. H01M 4/8605
429/523

FOREIGN PATENT DOCUMENTS

JP    2003-36856       2/2003
JP    2007-027064 A    2/2007
(Continued)

OTHER PUBLICATIONS

J. Noro et al., Bunseki, No. 7 (2009), pp. 349-355.

*Primary Examiner* — Wyatt P McConnell
(74) *Attorney, Agent, or Firm* — Finnegan, Henderson, Farabow, Garrett & Dunner, LLP (57) ABSTRACT

A catalyst layer for a fuel cell includes a catalyst-supporting carbon in which a catalyst is supported on carbon support powder of which particles have pores, a first electrolyte resin having an oxygen permeability of less than $2.2 \times 10^{-14}$ mol/(m·s·Pa) under an environment at a temperature of 80° C. and a relative humidity of 30%, and a second electrolyte resin having an oxygen permeability of $2.2 \times 10^{-14}$ mol/(m·s·Pa) or more under an environment at a temperature of 80° C. and a relative humidity of 30%. The content of the first electrolyte resin is an amount equal to or larger than a value X [g] obtained in the equation $X = S \times R/4436$ with respect to 1 g of the carbon support. S denotes a surface area [m²] of the carbon support. R denotes a proportion of the area of the outermost surface of the carbon support with respect to the surface area of the carbon support.

1 Claim, 5 Drawing Sheets

(51) Int. Cl.
    *H01M 4/86*     (2006.01)
    *H01M 8/1044*     (2016.01)
    *H01M 8/1039*     (2016.01)
    *H01M 8/1018*     (2016.01)

(56) References Cited

FOREIGN PATENT DOCUMENTS

| | | |
|---|---|---|
| JP | 2009-187848 | 8/2009 |
| JP | 2011-171119 | 9/2011 |
| JP | 2013-030287 A | 2/2013 |
| JP | 2013-37940 | 2/2013 |
| JP | 2016-58396 | 4/2016 |

* cited by examiner

TEST EXAMPLE 1-1

TEST EXAMPLE 1-2

TEST EXAMPLE 1-3

TEST EXAMPLE 1-4

FIG. 4

TEST EXAMPLE 2-1

TEST EXAMPLE 2-2

TEST EXAMPLE 2-3

TEST EXAMPLE 2-4

FIG. 5

CATALYST LAYER FOR FUEL CELL

INCORPORATION BY REFERENCE

The disclosure of Japanese Patent Application No. 2016-224289 filed on Nov. 17, 2016 including the specification, drawings and abstract is incorporated herein by reference in its entirety.

BACKGROUND

1. Technical Field

The present disclosure relates to a catalyst layer for a fuel cell.

2. Description of Related Art

A fuel cell such as a solid polymer type fuel cell includes a film and electrode assembly which includes an electrolyte film such as a polymer electrolyte film and a cathode-side electrode formed on one surface of the electrolyte film, and an anode-side electrode formed on the other surface of the electrolyte film. The cathode-side electrode and the anode-side electrode both include a catalyst layer containing a catalyst such as platinum and an electrolyte resin and a gas diffusion layer formed outside the catalyst layer.

When the catalyst layer is produced, a catalyst ink containing a catalyst-supporting carbon in which a catalyst such as platinum is supported on carbon support powder, an electrolyte resin and a dispersion medium is preferably used. In general, since a catalyst such as platinum is expensive, use of a small amount thereof is desirable. However, when the amount used is reduced, power generation performance of a fuel cell is likely to decrease.

In Japanese Unexamined Patent Application Publication No. 2013-037940 (JP 2013-037940 A), a catalyst layer containing a combination of a general type electrolyte resin and a highly oxygen permeable electrolyte resin as an electrolyte resin is disclosed (Claim 1). In JP 2013-037940 A, the proportion of the mass of the general type electrolyte resin is preferably 2 to 20% with respect to the combined mass of the general type electrolyte resin and the highly oxygen permeable electrolyte resin (Claim 2). In JP 2013-037940 A, as the electrolyte resin, the general type electrolyte resin and the highly oxygen permeable electrolyte resin are used in combination. When the highly oxygen permeable electrolyte resin is used, since oxygen easily comes in contact with a catalyst and a decrease in activity of the catalyst is prevented, it is possible to prevent the power generation performance from decreasing (paragraph 0021 and the like). In addition, when the general type electrolyte resin is used, and a preferable amount thereof is selected as described above, it is possible to prevent the occurrence of cracks in the catalyst layer when the highly oxygen permeable electrolyte resin is used (paragraph 0022 and the like).

SUMMARY

However, the inventors have conducted research and found that, in the configuration described in JP 2013-037940 A, sufficient prevention of cracks in the catalyst layer is not possible.

The present disclosure provides a catalyst layer for a fuel cell through which it is possible to effectively prevent activity of a catalyst from decreasing and the occurrence of cracks in the catalyst layer.

An aspect of the present disclosure relates to a catalyst layer for a fuel cell which includes a catalyst-supporting carbon in which a catalyst is supported on carbon support powder of which particles have pores, a first electrolyte resin having an oxygen permeability of less than $2.2 \times 10^{-14}$ mol/(m·s·Pa) under an environment at a temperature of 80° C. and a relative humidity of 30%, and a second electrolyte resin having an oxygen permeability of $2.2 \times 10^{-14}$ mol/(m·s·Pa) or more under an environment at a temperature of 80° C. and a relative humidity of 30%. The content of the first electrolyte resin is an amount equal to or larger than a value X [g] obtained in the following Equation (1) with respect to 1 g of the carbon support.

$$X = S \times R / 4436 \tag{1}$$

In Equation (1), S denotes a surface area [m²] of 1 g of the carbon support, and R denotes a proportion of the area of the outermost surface of the carbon support with respect to the surface area of the carbon support. The unit of 4436 is [m²/g].

In this specification, unless otherwise specified, the proportion R of the area of the outermost surface of the carbon support with respect to the surface area of the carbon support is defined in the following Equation (2).

$$R = F1/F2 \tag{2}$$

In Equation (2), F1 is a double-layer capacitance obtained through cyclic voltammetry under a fluorine-containing solvent, and F2 is a double-layer capacitance obtained through cyclic voltammetry under a humidified gas atmosphere.

Here, as a specific evaluation method of the cyclic voltammetry under a fluorine-containing solvent and the cyclic voltammetry under a humidified gas atmosphere, a method described in Japanese Unexamined Patent Application Publication No. 2011-171119 (JP 2011-171119 A) is applied.

In the catalyst layer for a fuel cell of the present disclosure, as an electrolyte resin, the first electrolyte resin which is a general type electrolyte resin and the second electrolyte resin which is a highly oxygen permeable electrolyte resin are used in combination. In the catalyst layer for a fuel cell of the present disclosure, the content of the general type electrolyte resin is a value X obtained in Equation (1) or more. At this content, the outermost surface of carbon support particles is favorably covered with the general type electrolyte resin, carbon support particles electrostatically repel each other, aggregation of carbon support particles is prevented, and it is possible to effectively prevent the occurrence of cracks in the catalyst layer. On the other hand, when the content of the general type electrolyte resin is less than a value X obtained in Equation (1) with respect to 1 g of the carbon support, the outermost surface of carbon support particles is not favorably covered with the general type electrolyte resin, aggregation of carbon support particles occurs, and there is a risk of the occurrence of cracks in the catalyst layer. When the amount of the general type electrolyte resin is too large, the presence of the general type electrolyte resin may hinder permeation of oxygen into the catalyst. However, when the highly oxygen permeable electrolyte resin is used in combination, it is possible to ensure sufficient permeation of oxygen into the catalyst and effectively prevent activity of the catalyst from decreasing. As a result, the fuel cell can stably exhibit favorable battery performance. According to the above operations and effects, in the present disclosure, it is possible to provide the catalyst layer for a fuel cell through which it is possible to effectively prevent activity of the catalyst from decreasing and the occurrence of cracks in the catalyst layer.

In the catalyst-supporting carbon, the catalyst may be supported in the pores of the carbon support. When the catalyst is present on the outermost surface of carbon support particles, the catalyst on the outermost surface of carbon support particles is covered with the general type electrolyte resin, and activity decreases, which may cause deterioration of battery performance. On the other hand, when a catalyst-supporting carbon in which a catalyst is supported in pores of carbon support particles is used, the catalyst is effectively prevented from being covered with the general type electrolyte resin, and it is possible to effectively prevent activity of the catalyst from decreasing. As a result, the fuel cell can stably exhibit favorable battery performance.

In the catalyst-supporting carbon, the catalyst may be supported in pores of the carbon support having a modal pore diameter of 1 to 20 nm and a pore volume of 7 cc/g or more in a pore diameter of 3 nm or more and less than 5 nm. In such a configuration, the catalyst is effectively prevented from being covered with the general type electrolyte resin, a decrease in activity of the catalyst is effectively prevented, a sufficient amount of catalyst is supported in pores of the carbon support, and thus the catalyst can stably exhibit high activity. As a result, the fuel cell can stably exhibit high battery performance. In this specification, unless otherwise specified, a modal pore diameter and a pore volume are measured by a gas adsorption method. As a specific evaluation method, a method described in Bunseki, 2009, 7, 349, Junji NORO, and Atsushi KATO is applied.

According to the present disclosure, it is possible to provide a catalyst layer for a fuel cell through which it is possible to effectively prevent activity of the catalyst from decreasing and the occurrence of cracks in the catalyst layer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
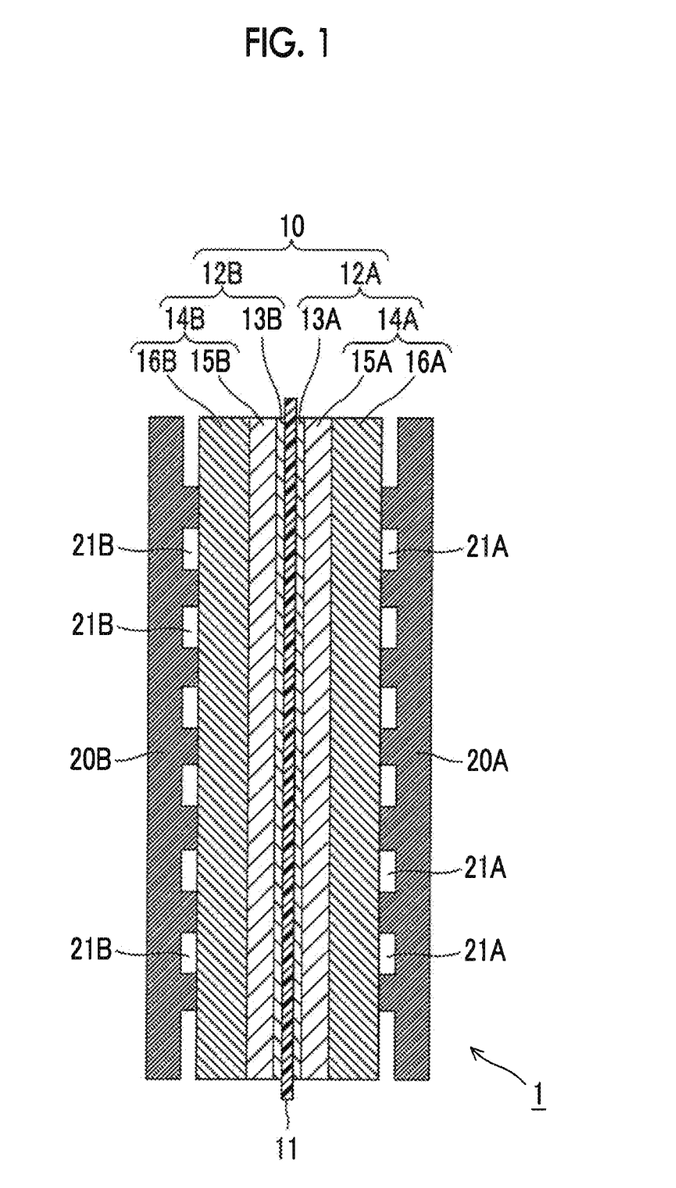
FIG. 1 is a schematic sectional view of a fuel cell according to an embodiment of the present disclosure.

A configuration of a fuel cell according to an embodiment of the present disclosure will be described with reference to the drawings. Here, while a solid polymer type fuel cell will be exemplified, the present disclosure can be applied to any fuel cell. FIG. 1 is a schematic sectional view of a single cell of a solid polymer type fuel cell.

A solid polymer type fuel cell 1 includes a film and electrode assembly 10 which includes an electrolyte film 11 and a cathode electrode 12A formed on one surface of the electrolyte film 11 and an anode electrode 12B formed on the other surface of the electrolyte film 11. The solid polymer type fuel cell 1 further includes a cathode-side separator 20A and an anode-side separator 20B outside the film and electrode assembly 10. As shown in FIG. 1, an oxidizing gas flow path 21A is provided between the film and electrode assembly 10 and the cathode-side separator 20A, and a fuel gas flow path 21B is provided between the film and electrode assembly 10 and the anode-side separator 20B. As an oxidizing gas, oxygen gas, air, and the like may be exemplified. As a fuel gas, hydrogen gas, methanol gas, and the like may be exemplified.

The electrolyte film 11 is a film which includes an electrolyte of, for example, a fluorine-containing ion exchange resin having a sulfonic acid group, and has proton conductivity. As a commercially available electrolyte film, a Nafion (registered trademark, commercially available from Du Pont) film, an Aciplex (registered trademark, commercially available from Asahi Kasei Corporation) film, a Flemion (registered trademark, commercially available from ASAHI GLASS Co., Ltd.) film, and the like may be exemplified.

The cathode electrode 12A has a structure in which a cathode-side catalyst layer 13A and a cathode-side gas diffusion layer 14A are laminated from the side of the electrolyte film 11. Similarly, the anode electrode 12B has a structure in which an anode-side catalyst layer 13B and an anode-side gas diffusion layer 14B are laminated from the side of the electrolyte film 11.

The catalyst layers 13A and 13B include (i) a catalyst-supporting carbon in which a catalyst is supported on carbon support powder of which particles have pores and (ii) an electrolyte resin. As a material of the carbon support, carbon black such as acetylene black is preferable. As the catalyst, a noble metal catalyst such as platinum, gold, and palladium is preferable. In the present embodiment, in the catalyst layers 13A and 13B, a first electrolyte resin which is a general type electrolyte resin and a second electrolyte resin which is a highly oxygen permeable electrolyte resin are used in combination as an electrolyte resin. In this specification, the "general type electrolyte resin" refers to an electrolyte resin having an oxygen permeability of less than $2.2 \times 10^{-14}$ mol/(m·s·Pa) under an environment at a temperature of 80° C. and a relative humidity of 30%, and the "highly oxygen permeable electrolyte resin" refers to an electrolyte resin having an oxygen permeability of $2.2 \times 10^{-14}$ mol/(m·s·Pa) or more under an environment at a temperature of 80° C. and a relative humidity of 30%. The catalyst layers 13A and 13B can be formed by applying a catalyst ink containing the catalyst-supporting carbon, the first electrolyte resin (general type electrolyte resin), the second electrolyte resin (highly oxygen permeable electrolyte resin), and a dispersion medium to the electrolyte film 11 and performing drying.

In this specification, unless otherwise specified, "oxygen permeability of the electrolyte resin" is data measured by a linear sweep voltammetry (LSV) method using an electrolyte resin film (cast-molded film or the like) with a thickness of about 0.2 mm as a sample under conditions of a temperature of 80° C. and a relative humidity of 30%.

As the general type electrolyte resin, a general fluorine-containing ion exchange resin having few or no aliphatic ring structures in the basic skeleton, specifically, a fluorine-containing ion exchange resin having a sulfonic acid group can be used. As a commercially available general type electrolyte resin, Nafion (registered trademark, commercially available from Du Pont), Aciplex (registered trademark, commercially available from Asahi Kasei Corporation), and Flemion (registered trademark, commercially available from ASAHI GLASS Co., Ltd.), and the like may be exemplified. As the highly oxygen permeable electrolyte resin, as disclosed in claims 1 to 4 in Japanese Unexamined Patent Application Publication No. 2003-36856 (JP 2003-36856 A), a fluorine-containing ion exchange resin having an aliphatic ring structure in the basic skeleton and preferably, a polymer including repeating units derived from perfluorocarbons having an aliphatic ring structure can be used.

As the dispersion medium used in the catalyst ink, water and the like may be exemplified. In order to improve dispersibility, a surfactant can be added to the dispersion medium as necessary. As the surfactant, a nonionic surfactant is preferable.

In the present embodiment, the content of the first electrolyte resin (general type electrolyte resin) in the catalyst layers 13A and 13B is an amount equal to or larger than a value X [g] obtained in the following Equation (1) with respect to 1 g of the carbon support.

$$X = S \times R / 4436 \quad (1)$$

In Equation (1), S denotes a surface area [m$^2$] of the carbon support, and R denotes a proportion of the area of the outermost surface of the carbon support with respect to the surface area of the carbon support. The unit of 4436 is [m$^2$/g]. Here, the area of the outermost surface is an area obtained by removing the area of pores of the carbon support from the surface area of the carbon support. In addition, pores may be indentations or through-holes.

When the content of the general type electrolyte resin is equal to or larger than the value X obtained in Equation (1), the outermost surface of carbon support particles is favorably covered with the general type electrolyte resin, carbon support particles electrostatically repel each other, aggregation of carbon support particles is prevented, and it is possible to effectively prevent the occurrence of cracks in the catalyst layers 13A and 13. On the other hand, when the content of the general type electrolyte resin is less than the value X obtained in Equation (1) with respect to 1 g of the carbon support, the outermost surface of carbon support particles is not favorably covered with the general type electrolyte resin, aggregation of carbon support particles occurs, and there is a risk of the occurrence of cracks in the catalyst layers 13A and 13.

Figure 5:
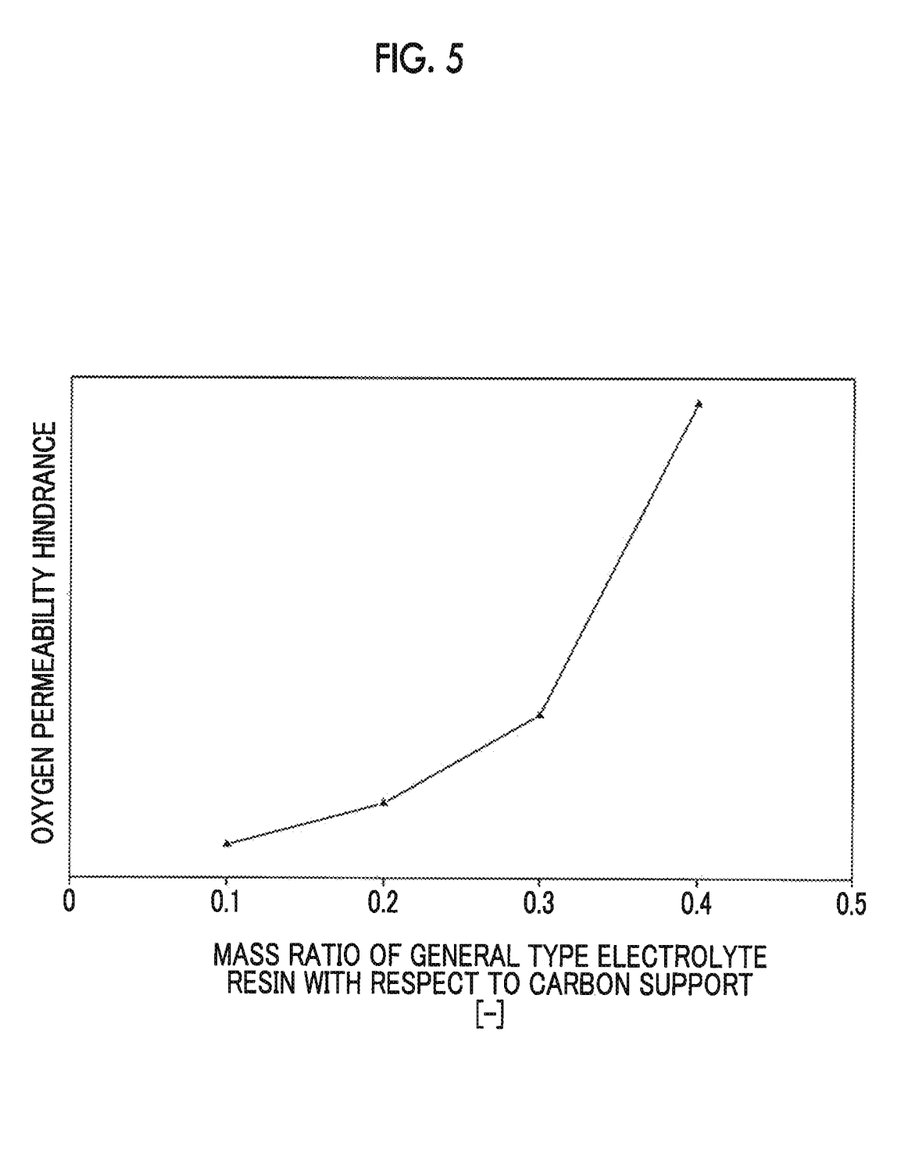
FIG. 5 is a graph showing an example of measurement of the relationship between the mass ratio of a general type electrolyte resin with respect to a carbon support when only the general type electrolyte resin is used as an electrolyte resin and oxygen permeability hindrance.

In general, when an amount of the general type electrolyte resin added with respect to the catalyst-supporting carbon is large, the presence of the general type electrolyte resin may hinder permeation of oxygen into the catalyst. FIG. 5 shows an example of measuring the relationship between the mass ratio of the general type electrolyte resin with respect to the carbon support when only the general type electrolyte resin is used as the electrolyte resin and oxygen permeability hindrance (evaluated by a reciprocal number of a limit current value when power is generated at a reduced oxygen concentration). In the present embodiment, when the first electrolyte resin which is the general type electrolyte resin and the second electrolyte resin which is the highly oxygen permeable electrolyte resin are used in combination, it is possible to ensure sufficient permeation of oxygen into the catalyst and effectively prevent activity of the catalyst from decreasing. As a result, the solid polymer type fuel cell 1 can stably exhibit favorable battery performance.

In the present embodiment, in the catalyst-supporting carbon, preferably, a catalyst is supported in pores of the carbon support. When the catalyst is present on the outermost surface of carbon support particles, the catalyst on the outermost surface of carbon support particles is covered with the general type electrolyte resin, and activity decreases, which may cause deterioration of battery performance. On the other hand, when a catalyst-supporting carbon in which a catalyst is supported in pores of carbon support particles is used, the catalyst is effectively prevented from being covered with the general type electrolyte resin, and it is possible to effectively prevent activity of the catalyst from decreasing. As a result, the solid polymer type fuel cell 1 can stably exhibit favorable battery performance.

In the catalyst layers 13A and 13B, in the catalyst-supporting carbon, preferably, a catalyst is supported in pores of a carbon support having a modal pore diameter of 1 to 20 nm, and a pore volume of 7 cc/g or more in a pore diameter of 3 nm or more and less than 5 nm. In such a configuration, the catalyst is effectively prevented from being covered with the general type electrolyte resin, a decrease in activity of the catalyst is effectively prevented, and a sufficient amount of catalyst is supported in pores of the carbon support. Therefore, the catalyst can stably exhibit high activity. As a result, the solid polymer type fuel cell 1 can stably exhibit high battery performance.

The cathode-side gas diffusion layer 14A has a structure in which a cathode-side microporous layer 15A and a cathode-side substrate 16A are laminated from the side of the electrolyte film 11. Similarly, the anode-side gas diffusion layer 14B has a structure in which an anode-side microporous layer 15B and an anode-side substrate 16B are laminated from the side of the electrolyte film 11. The gas diffusion layers 14A and 14B have gas permeability and water permeability. The gas diffusion layers 14A and 14B can be produced by applying a paste composition for forming a microporous layer to the substrates 16A and 16B, and performing drying and calcining to form the microporous layers 15A and 15B.

The substrates 16A and 16B are made of a conductive porous material. As a material of the substrates 16A and 16B, various carbons such as graphite, expanded graphite, and nano carbon, a metal such as stainless steel, molybdenum, and titanium, and the like may be exemplified. Exemplary forms of the substrates 16A and 16B include fibrous, particle, woven fabric, and nonwoven fabric forms. As the substrates 16A and 16B, a carbon paper, a carbon cloth, and a carbon felt (carbon nonwoven fabric) are preferable. In order to improve water repellency of the gas diffusion layers 14A and 14B, a known water repellent treatment is preferably performed.

The paste composition for forming a microporous layer includes a conductive material, a water repellent material, and a dispersion medium. As the conductive material, carbon black such as acetylene black and various carbons such as graphite and a carbon fiber are preferable. Among these, carbon black such as acetylene black is preferable because it has excellent electron conductivity, has a large specific surface area, and has high purity, and is easy to use. As the water repellent material, a fluororesin such as polytetrafluoroethylene (PTFE) is preferable. PFFE in the form of an emulsion can be mixed into the paste composition for forming a microporous layer. Here, PTFE may be a homopolymer of tetrafluoroethylene or may be a modified PTFE which includes a halogenated olefin such as chlorotrifluoroethylene and hexafluoropropylene; and a unit derived from another fluorine-based monomer such as perfluoroalkyl vinyl ether.

As the dispersion medium used in the paste composition for forming a microporous layer, water and the like may be exemplified. In order to improve dispersibility, a surfactant can be added to the dispersion medium as necessary. As the surfactant, a nonionic surfactant is preferable. Here, when PTFE in the form of an emulsion is added, a liquid component in the emulsion is included in the dispersion medium of the paste composition for forming a microporous layer.

In the solid polymer type fuel cell 1 having the above structure, a part of the oxidizing gas supplied to the oxidizing gas flow path 21A from the outside is supplied to the cathode-side catalyst layer 13A via the cathode-side gas diffusion layer 14A. On the other hand, a part of the fuel gas supplied to the fuel gas flow path 21B from the outside is supplied to the anode-side catalyst layer 13B via the anode-side gas diffusion layer 14B, and hydrogen ions (protons) are generated due to a reaction in the presence of a catalyst. The hydrogen ions generated in the anode-side catalyst layer 13B selectively permeate the electrolyte film 11 and react with oxygen and electrons in the presence of a catalyst in the cathode-side catalyst layer 13A to generate water. The generated water is discharged to the outside via the cathode-side gas diffusion layer 14A. In the fuel cell, electrical energy (power generation) is generated due to the chemical reaction of hydrogen and oxygen as described above.

As described above, according to the present embodiment, it is possible to provide the catalyst layers 13A and 13B for a fuel cell through which it is possible to effectively prevent activity of the catalyst from decreasing and the occurrence of cracks in the catalyst layer.

Test examples will be described below. "Materials" Materials used were as follows.

<Carbon Support>

The following carbon supports C1 and C2 of two types were prepared.

C1: a carbon support having a modal pore diameter of 1 to 20 nm, a pore volume PV of 7.7 cc/g in a pore diameter of 3 nm or more and less than 5 nm, a surface area S of 1000 m$^2$/g, and a proportion R (0.65) of the outermost surface with respect to the surface area.

C2: a carbon support having a modal pore diameter of 1 to 20 nm, a pore volume PV of 9.2 cc/g in a pore diameter of 3 nm or more and less than 5 nm, a surface area S of 1150 m$^2$/g, and a proportion R (0.70) of the outermost surface with respect to the surface area.

Main physical properties data of the carbon supports C1 and C2 are shown in Table 1.

<Catalyst-Supporting Carbon>

Figure 2:
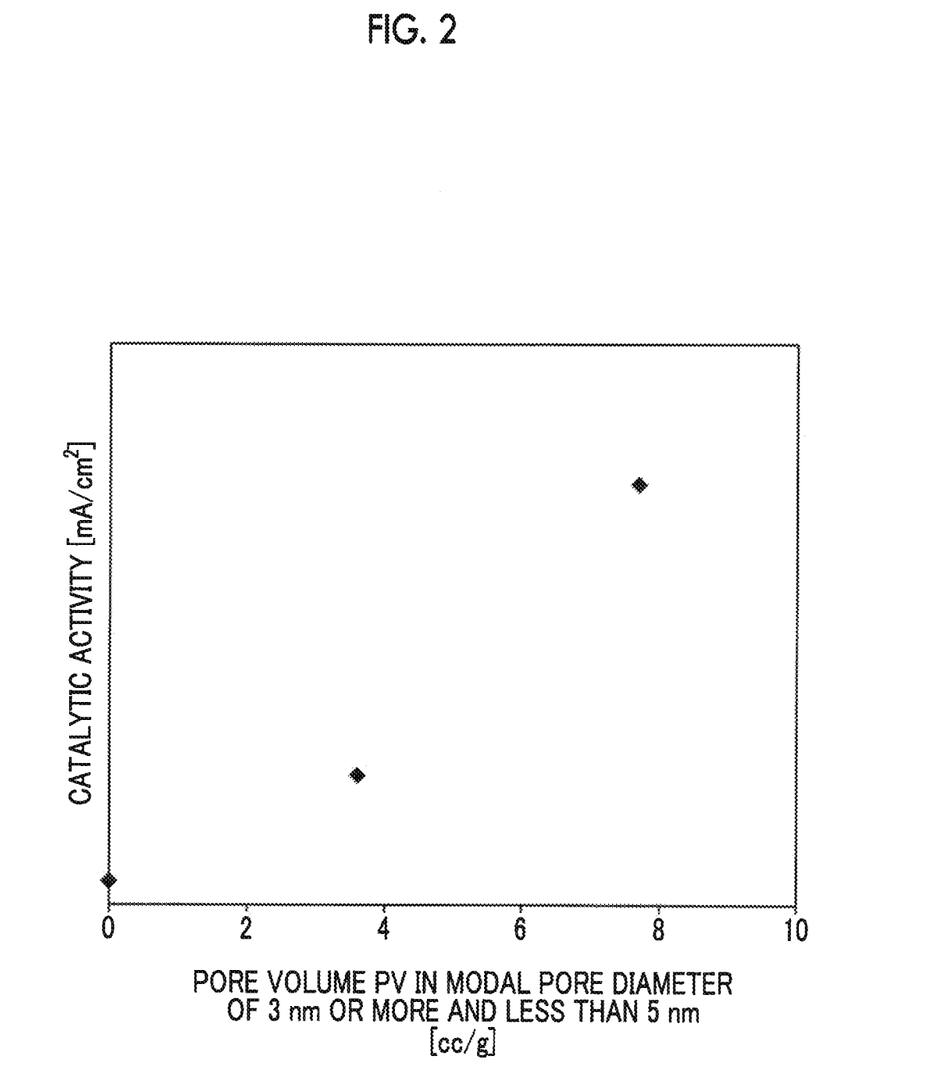
FIG. 2 is a graph showing the relationship between a pore volume PV in a pore diameter of 3 nm or more and less than 5 nm of catalyst-supporting carbons used in the section of DETAILED DESCRIPTION OF EMBODIMENTS and catalytic activity.

A platinum catalyst Pt was prepared as a catalyst and was supported in pores of the carbon supports C1 and C2 of two types according to a known method to obtain catalyst-supporting carbons PtC1 and PtC2. Both amounts of the platinum catalyst supported on the carbon support were set to 40 mass %. Main production conditions of the catalyst-supporting carbons are shown in Table 1. FIG. 2 shows the relationship between the pore volume PV in a pore diameter of 3 nm or more and less than 5 nm of the catalyst-supporting carbons and catalytic activity. Here, the catalytic activity was obtained by measuring a current flowing when 200 sec had elapsed after being left at a constant voltage (0.88 V) at a cell temperature of 60° and under a gas atmosphere of a relative humidity of 80%.

<Electrolyte Resin>

The following electrolyte resins ER1 and ER2 of two types were prepared.

ER1: an ionomer resin having a sulfonic acid group, a general type electrolyte resin having an IEC of 1.1 meq/g, and an oxygen permeability of $0.7 \times 10^{-14}$ mol/(m·s·Pa) under an environment at a temperature of 80° C. and a relative humidity of 30%.

ER2: an ionomer resin having a sulfonic acid group, a highly oxygen permeable electrolyte resin having an IEC of 1.2 meq/g, and an oxygen permeability of $2.5 \times 10^{-14}$ mol/(m·s·Pa) under an environment at a temperature of 80° C. and a relative humidity of 30%.

Here, "IEC" is an equivalent weight of the sulfonic acid group per mass of the ionomer resin.

Examples 1-1 to 1-4 and 2-1 to 2-4 of Producing Catalyst Ink

Here, 0 to 0.2 g of the electrolyte resin ER1 (general type electrolyte resin) and 0.65 g of the electrolyte resin ER2 (highly oxygen permeable electrolyte resin) were added to 1 g of any one of the catalyst-supporting carbons PtC1 and PtC2 of two types, and dispersed using a dispersion medium (deionized water and ethanol) to prepare catalyst inks I11 to I14, and I21 to I24. Solid compositions of the catalyst inks of the production examples are shown in Table 2 and Table 3. The units of the amounts blended in in Table 2 and Table 3 are "g."

Test Examples 1-1 to 1-4, and 2-1 to 2-4

In Test Examples 1-1 to 1-4 and Test Examples 2-1 to 2-4, under the same conditions except that a catalyst ink used was changed, the obtained catalyst ink was applied to a Teflon (registered trademark) sheet using a bar coater and dried to form a catalyst layer. Main production conditions of the test examples are shown in Table 2 and Table 3.

[Evaluation Items and Evaluation Method]

(SEM observation) Surfaces of the catalyst layers obtained in the test examples were observed under a scanning electron microscope (SEM) and it was evaluated whether cracks occurred.

[Evaluation Results]

Figure 3:
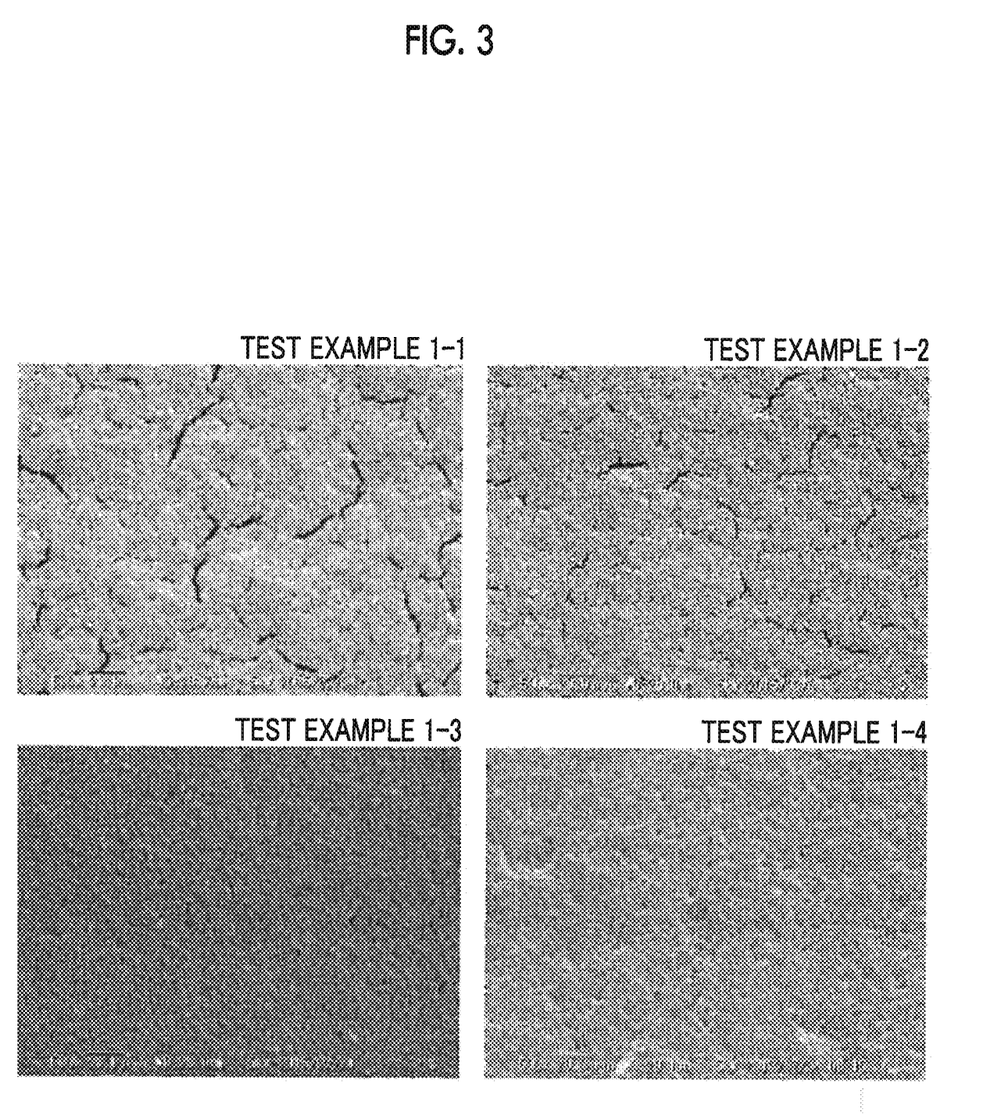
FIG. 3 shows SEM surface photos of catalyst layers obtained in Test Examples 1-1 to 1-4.
Figure 4:
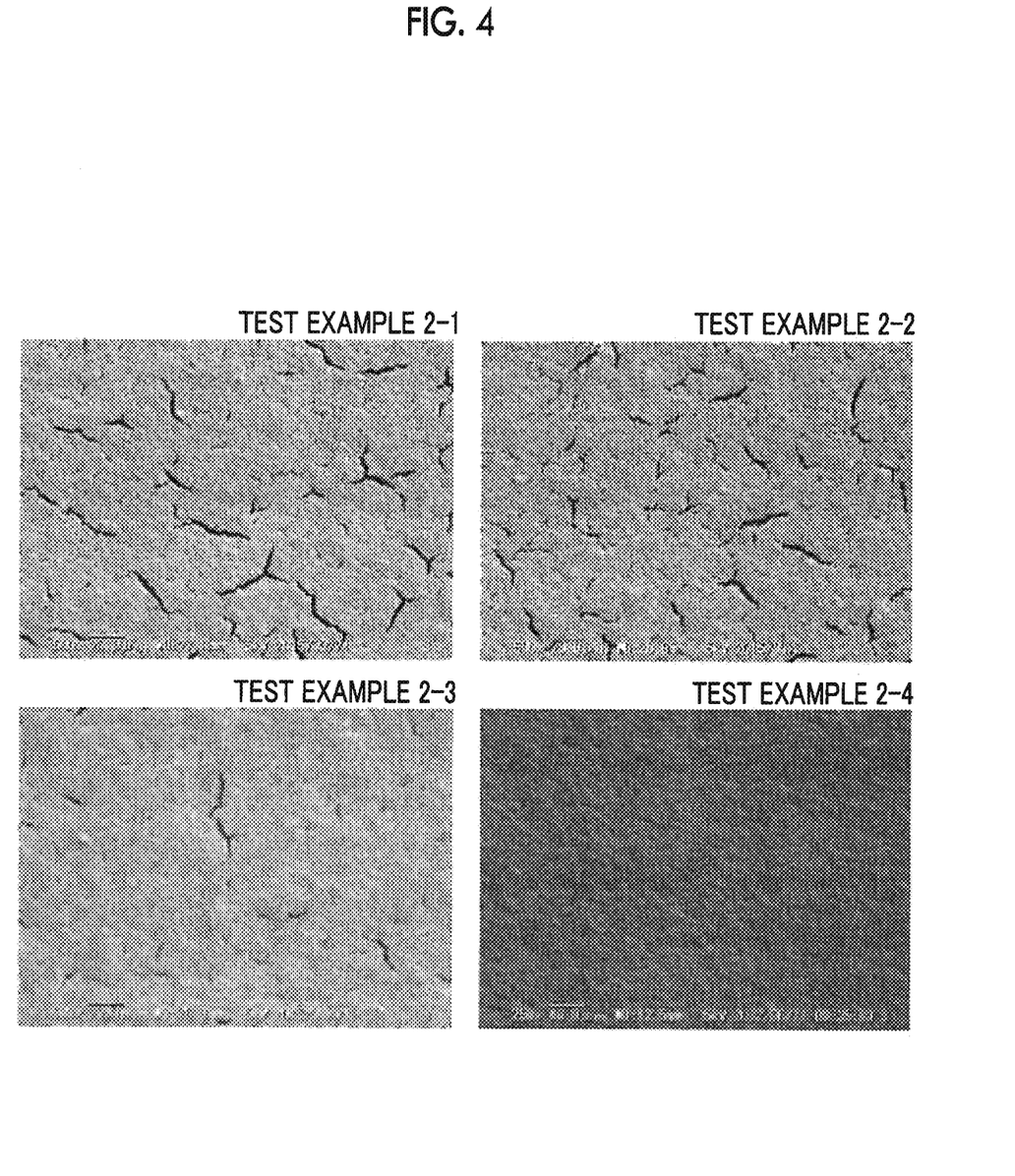
FIG. 4 shows SEM surface photos of catalyst layers obtained in Test Examples 2-1 to 2-4.

FIG. 3 and FIG. 4 show SEM surface photos of the catalyst layers obtained in the test examples. Table 2 and Table 3 show evaluation results (cracks or no cracks) of the test examples. The carbon supports used in Test Examples 1-1 to 1-4 had X [g]=S×R/4436=0.1465. In Test Examples 1-1 and 1-2 in which the amount of the general type electrolyte resin added with respect to 1 g of the carbon support was less than X [g], cracks in the catalyst layer were observed. On the other hand, in Test Examples 1-3 and 1-4 in which the amount of the general type electrolyte resin added with respect to 1 g of the carbon support was X [g] or more, no cracks in the catalyst layer were observed. The carbon supports used in Test Examples 2-1 to 2-4 had X [g]=S×R/4436=–0.1815. In Test Examples 2-1 to 2-3 in which the amount of the general type electrolyte resin added with respect to 1 g of the carbon support was less than X [g], cracks in the catalyst layer were observed. On the other hand, in Test Example 2-4 in which the amount of the general type electrolyte resin added with respect to 1 g of the carbon support was X [g] or more, no cracks in the catalyst layer were observed.

TABLE 1

| Catalyst-supporting carbon | Carbon support | | | | Catalyst |
|---|---|---|---|---|---|
| | | PV [cc/g] | S [m²/g] | R [—] | X(=S × R/4436) [g] | |
| PtC1 | C1 | 7.7 | 1000 | 0.65 | 0.1465 | Pt |
| PtC2 | C2 | 9.2 | 1150 | 0.70 | 0.1815 | Pt |

TABLE 2

| | | Test Example 1-1 | Test Example 1-2 | Test Example 1-3 | Test Example 1-4 |
|---|---|---|---|---|---|
| Catalyst ink | | I11 | I12 | I13 | I14 |
| Catalyst-supporting carbon | PtC1 | 1.0 | 1.0 | 1.0 | 1.0 |
| | PtC2 | — | — | — | — |
| General type electrolyte resin | ER1 | 0 | 0.05 | 0.15 | 0.20 |
| Highly oxygen permeable electrolyte resin | ER2 | 0.65 | 0.65 | 0.65 | 0.65 |
| Cracks in catalyst layer | | Yes | Yes | No | No |

TABLE 3

| | | Test Example 2-1 | Test Example 2-2 | Test Example 2-3 | Test Example 2-4 |
|---|---|---|---|---|---|
| Catalyst ink | | I21 | I22 | I23 | I24 |
| Catalyst-supporting carbon | PtC1 | — | — | — | — |
| | PtC2 | 1.0 | 1.0 | 1.0 | 1.0 |
| General type electrolyte resin | ER1 | 0 | 0.05 | 0.15 | 0.20 |
| Highly oxygen permeable electrolyte resin | ER2 | 0.65 | 0.65 | 0.65 | 0.65 |
| Cracks in catalyst layer | | Yes | Yes | Yes | No |

The present disclosure is not limited to the embodiment and designs can be appropriately changed without departing from the spirit and scope of the present disclosure. For example, when a plurality of types of carbon supports are used, a sum of values obtained by multiplying the surface area per 1 g of each of the carbon supports by a content ratio thereof with respect to all of the carbon supports may be used as the surface area of the carbon support per 1 g. The outermost surface per 1 g of the carbon support in which a plurality of types of carbon supports are completely mixed in may be used as "the outermost surface of the carbon support."

What is claimed is:

1. A catalyst layer for a fuel cell, comprising:
   a catalyst-supporting carbon in which a catalyst is supported in pores of a carbon support powder;
   a first electrolyte resin having an oxygen permeability of less than $2.2 \times 10^{-14}$ mol/(m·s·Pa) under an environment at a temperature of 80° C. and a relative humidity of 30%; and
   a second electrolyte resin having an oxygen permeability of $2.2 \times 10^{-14}$ mol/(m·s·Pa) or more under an environment at a temperature of 80° C. and a relative humidity of 30%,
   wherein a content of the first electrolyte resin is an amount equal to or larger than a value X [g] obtained in a following Equation (1) with respect to 1 g of the carbon support, $$X = S \times R/4436 \qquad (1)$$

wherein, in Equation (1), S denotes a surface area [m²] of 1 g of the carbon support, R denotes a proportion of the area of an outermost surface of the carbon support with respect to the surface area of the carbon support, the area of the outermost surface is an area obtained by removing the area of pores of the carbon support from the surface area of the carbon support, and a unit of 4436 is [m²/g], and
   wherein, in the catalyst-supporting carbon, the catalyst is supported in the pores of the carbon support having a modal pore diameter of 1 to 20 nm and a pore volume of 7 cc/a or more in a pore diameter of 3 nm or more and less than 5 nm.

\* \* \* \* \*